United States Patent
Boyd et al.

(10) Patent No.: US 8,532,487 B2
(45) Date of Patent: Sep. 10, 2013

(54) MANAGED PON REPEATER AND CROSS CONNECT

(75) Inventors: Edward W. Boyd, Petaluma, CA (US); Stephen M. Johnson, Rohnert Park, CA (US)

(73) Assignee: Broadcom Corporation, Irvine, CA (US)

( * ) Notice: Subject to any disclaimer, the term of this patent is extended or adjusted under 35 U.S.C. 154(b) by 467 days.

(21) Appl. No.: 12/581,452

(22) Filed: Oct. 19, 2009

(65) Prior Publication Data

US 2010/0098412 A1  Apr. 22, 2010

Related U.S. Application Data (60) Provisional application No. 61/107,263, filed on Oct. 21, 2008.

(51) Int. Cl.
*H04J 14/00* (2006.01)
*H04B 17/00* (2006.01)

(52) U.S. Cl.
USPC .................................. 398/67; 398/45; 398/48

(58) Field of Classification Search
USPC .................... 398/45–56, 66–73, 168
See application file for complete search history.

(56) References Cited

U.S. PATENT DOCUMENTS

| | | | |
|---|---|---|---|
| 5,502,587 A * | 3/1996 | Frigo | 398/58 |
| 6,532,089 B1 * | 3/2003 | Asahi | 398/82 |
| 7,013,084 B2 * | 3/2006 | Battou et al. | 398/45 |
| 7,027,731 B1 * | 4/2006 | Wang et al. | 398/45 |
| 7,110,670 B1 * | 9/2006 | Au et al. | 398/48 |
| 7,233,741 B2 * | 6/2007 | Ishizuka et al. | 398/48 |
| 2001/0030787 A1 * | 10/2001 | Tajima | 359/128 |
| 2002/0196801 A1 * | 12/2002 | Haran et al. | 370/432 |
| 2003/0063841 A1 * | 4/2003 | Shiozawa et al. | 385/18 |
| 2003/0147645 A1 * | 8/2003 | Imajuku et al. | 398/7 |
| 2004/0033077 A1 * | 2/2004 | Kim et al. | 398/72 |
| 2004/0120715 A1 * | 6/2004 | Shin et al. | 398/91 |

(Continued)

FOREIGN PATENT DOCUMENTS

| | | |
|---|---|---|
| WO | WO 2008/056843 A1 | 5/2008 |
| WO | WO 2008/114110 A1 | 9/2008 |
| WO | WO 2010/048193 A2 | 4/2010 |

OTHER PUBLICATIONS

International Search Report directed to related International Patent Application No. PCT/US2009/061339, Korean Intellectual Property Office, Daejeon, Korea, mailed May 27, 2010; 3 pages.

(Continued)

*Primary Examiner* — Nathan Curs
*Assistant Examiner* — Tanya Ngo
(74) *Attorney, Agent, or Firm* — Sterne, Kessler, Goldstein & Fox P.L.L.C.

(57) ABSTRACT

One embodiment provides an intelligent passive optical network (PON) node. The intelligent PON node includes a number of optical line terminal (OLT)-side transceivers coupled to a first optical fiber, a number of optical network unit (ONU)-side transceivers, a switching mechanism configured to couple the OLT-side transceivers and the ONU-side transceivers, and a controller configured to control the coupling operation of the switching mechanism. The OLT-side transceivers are configured to transmit optical signals on a number of wavelength channels to and receive optical signals on a number of wavelength channels from the OLT. A respective ONU-side transceiver is configured to transmit optical signals to and receive optical signals from a downstream PON.

21 Claims, 9 Drawing Sheets

(56) References Cited

U.S. PATENT DOCUMENTS

| | | |
|---|---|---|
| 2005/0052305 A1* | 3/2005 | Voicu et al. .................. 341/154 |
| 2006/0257149 A1* | 11/2006 | Hirth et al. ...................... 398/72 |
| 2007/0065152 A1* | 3/2007 | Chiesa et al. ................. 398/138 |
| 2007/0154217 A1 | 7/2007 | Kim et al. |
| 2007/0183779 A1 | 8/2007 | Bouda et al. |
| 2008/0063407 A1* | 3/2008 | Singh et al. .................. 398/140 |
| 2008/0089692 A1* | 4/2008 | Sorin ............................. 398/135 |
| 2008/0205889 A1* | 8/2008 | Aoki ............................... 398/51 |
| 2009/0003827 A1* | 1/2009 | Kai et al. ........................ 398/45 |
| 2009/0067835 A1* | 3/2009 | Chen ............................... 398/45 |
| 2009/0110398 A1 | 4/2009 | Pfeiffer |
| 2009/0196606 A1* | 8/2009 | Miyagi et al. ................... 398/45 |
| 2010/0158518 A1* | 6/2010 | Shin et al. ....................... 398/45 |
| 2012/0263462 A1* | 10/2012 | Koren et al. ..................... 398/45 |

OTHER PUBLICATIONS

International Preliminary Report on Patentability directed to related International Patent Application No. PCT/US2009/061339, The International Bureau of WIPO, Geneva, Switzerland, mailed Apr. 26, 2011; 5 pages.

Written Opinion directed toward International Application No. PCT/US2009/061339, United States Patent and Trademark Office, United States, mailed on May 27, 2010.

* cited by examiner

MANAGED PON REPEATER AND CROSS CONNECT

RELATED APPLICATION

This application claims the benefit of U.S. Provisional Application No. 61/107,263, entitled "Passive Optical Network Extender," by inventor Edward W. Boyd, filed 21 Oct. 2008.

BACKGROUND

1. Field

This disclosure is generally related to a passive optical network (PON). More specifically, this disclosure is related to a PON with extended reach.

2. Related Art

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies, such as ring and mesh topologies, are also possible.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through a customer-premises equipment (CPE).

In the example of an Ethernet PON (EPON), communications can include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more Logical Link Identifiers (LLIDs), and a data packet transmitted by the OLT typically specifies an LLID of the destination ONU. In the upstream direction, the ONUs need to share channel capacity and resources, because there is only one link coupling the passive optical coupler to the OLT.

Figure 1:
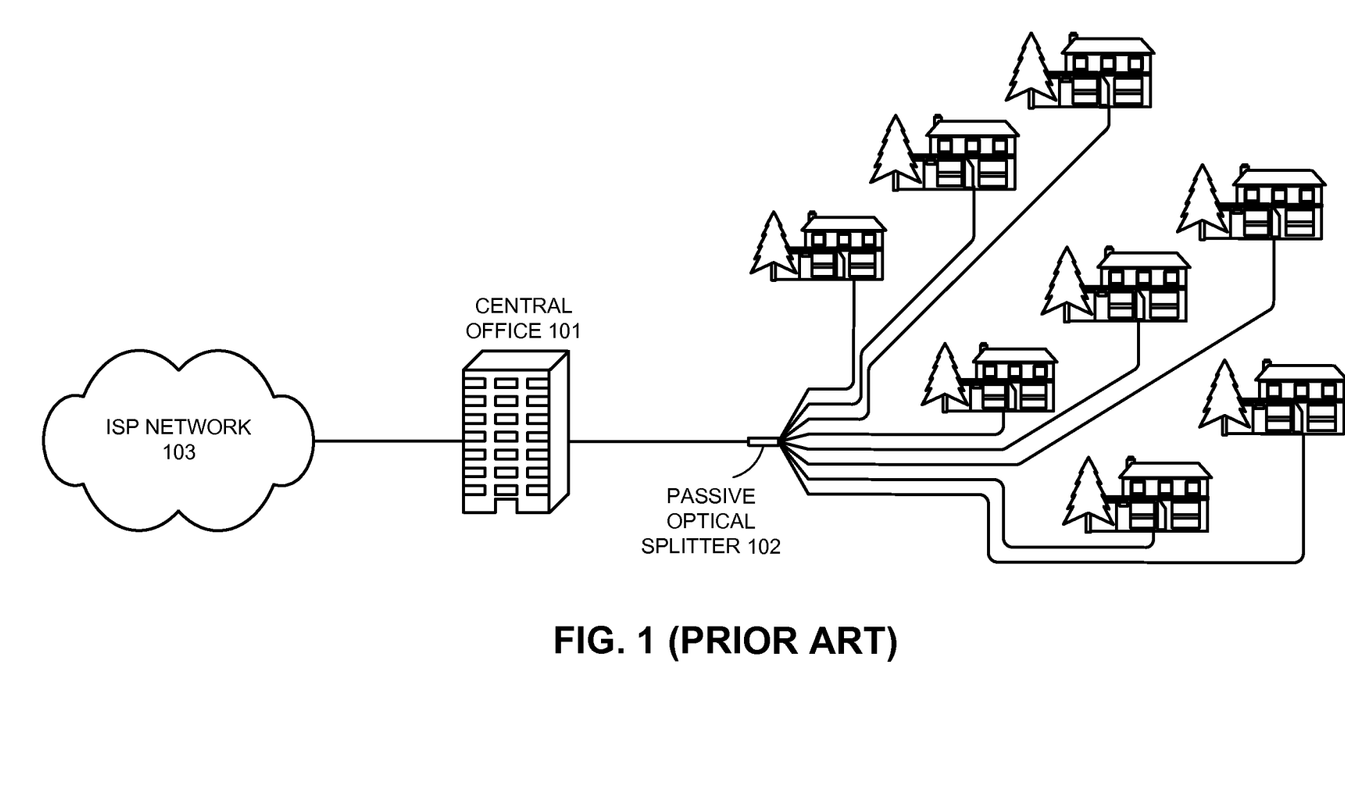
FIG. 1 presents a diagram illustrating a PON wherein a central office and a number of customers are coupled through optical fibers and a passive optical splitter (prior art).

FIG. 1 illustrates a passive optical network including a central office and a number of customers coupled through optical fibers and a passive optical splitter (prior art). A passive optical splitter 102 and optical fibers couple the customers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs), and gigabit PONs (GPONs, which are PONs using a variant of a generic framing protocol).

In order to reduce the cost of delivering the broadband service to subscribers, it is desirable for a service provider to deliver service to a great number of subscribers, such as over 500 subscribers, from a single node. In order to deliver service to subscribers in more sparsely populated areas in a cost efficient way, it is desirable to implement a PON that can reach subscribers who are located a long distance, such as over 100 km, away from a central office. However, the passive nature of the PON plus the splitting-induced loss have limited the number of subscribers within a PON, typically 32 or 64, and the distance from the central office to a subscriber (the distance from an OLT to an ONU), typically 20 km.

SUMMARY

One embodiment provides an intelligent passive optical network (PON) node. The intelligent PON node includes a number of optical line terminal (OLT)-side transceivers coupled to a first optical fiber, a number of optical network unit (ONU)-side transceivers, a switching mechanism configured to couple the OLT-side transceivers and the ONU-side transceivers, and a controller configured to control the coupling operation of the switching mechanism. The OLT-side transceivers are configured to transmit optical signals on a number of wavelength channels to and receive optical signals on a number of wavelength channels from the OLT. A respective ONU-side transceiver is configured to transmit optical signals to and receive optical signals from a downstream PON.

In a variation on the embodiment, the controller is configured to register as an ONU.

In a variation on the embodiment, the intelligent node controller is configured to receive an Operations, Administration, and Management (OAM) message from the OLT, thereby facilitating remote management of the intelligent node.

In a variation on the embodiment, the controller is configured to conduct the performance monitoring.

In a variation on the embodiment, the controller is configured to aggregate upstream traffic from a number downstream PONs.

In a variation on the embodiment, the intelligent PON node includes at least one of: one OLT-side transceiver coupled to a second optical fiber to facilitate protection switching between the OLT and the intelligent PON node, and one ONU-side transceiver coupled to a spare optical fiber to facilitate protection switching between the intelligent PON node and a downstream passive optical splitter.

In a variation on the embodiment, during a discovery process the controller is configured to identify a port, through which a newly discovered ONU is coupled to the intelligent PON node.

In a variation on the embodiment, the intelligent PON node is coupled to the OLT via a first passive optical splitter, and the downstream PON via a second passive optical splitter.

In a variation on the embodiment, the controller is implemented as a system-on-a-chip (SoC).

In a variation on the embodiment, at least one ONU-side transceiver is configured to transmit optical signals to and receive optical signals from a different intelligent PON node.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

One approach to increasing the number of subscribers supported by a hybrid fiber-coaxial (HFC) system is to increase the number of fibers connecting the central office and the fiber node. However, adding new fibers can be expensive. Another approach includes placing a PON OLT in the field and using optical fibers to connect the OLT to other equipments in the central office. However, current OLT equipments might not be suitable for deployment in the field. For example, remote nodes are often pole mounted or strand mounted in an outdoor environment with little or no temperature control. An OLT, due to its complex nature, often is not suitable to withstand such an environment.

Embodiments of the present invention provide a system for extending the reach of a PON by using an intelligent PON node. This intelligent PON node includes OLT-side optics for interfacing with the OLT and ONU-side PON optics for interfacing with multiple downstream PONs. The reach of the PON can be extended by a trunk fiber that couples the intelligent PON node with the OLT. The intelligent PON node also includes a reconfigurable switching mechanism for cross-connecting the WDM signals on the OLT side and the PON signals on the ONU side. An intelligent node controller, which can be registered as an ONU, controls the configuration of the switching mechanism and facilitates protection switching, loopback, and other network management functionalities. In addition, the intelligent node controller can aggregate upstream traffic from lightly loaded and geographically dispersed downstream PONs.

Multi-Wavelength PON

Figure 2A:
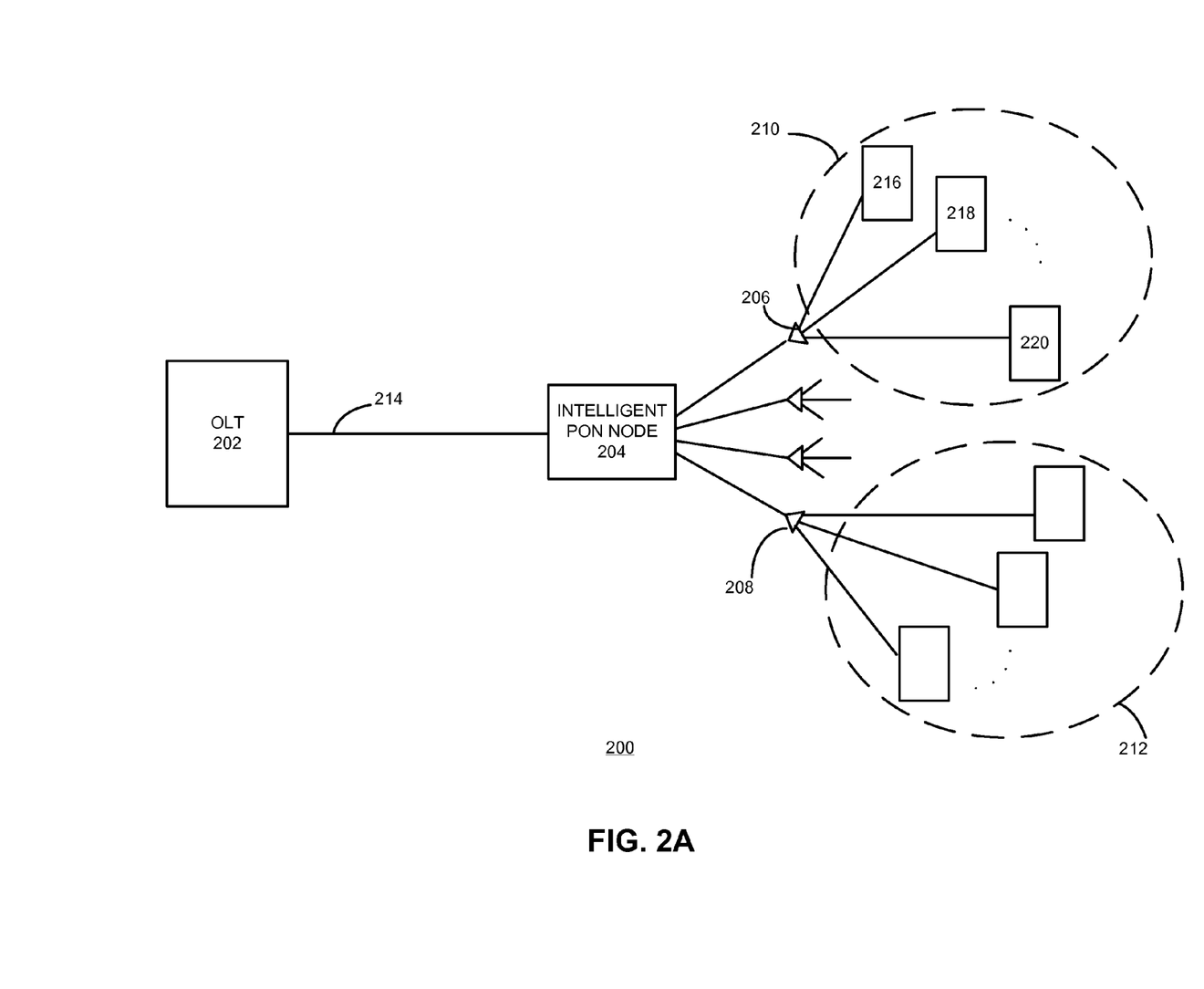
FIG. 2A presents a diagram illustrating the architecture of an exemplary PON with extended reach in accordance with an embodiment of the present invention.

Instead of placing the entire OLT in the field, embodiments of the present invention provide a solution that places the more environment-tolerant optical transmission equipment in the field while keeping the more fragile OLT line card within the central office. FIG. 2A presents a diagram illustrating the architecture of an exemplary PON with extended reach in accordance with an embodiment of the present invention. PON 200 includes an OLT 202, an intelligent PON node 204, a number of passive optical splitters, including passive optical splitters 206 and 208, and a number of ONU sets, including ONU sets 210 and 212.

OLT 202 remains in the central office and communicates with intelligent PON node 204 via an optical trunk fiber 214. By implementing WDM (which can be coarse WDM (CWDM) or dense WDM (DWDM)), multiple wavelength channels can co-exist on trunk fiber 214 between OLT 202 and intelligent PON node 204. In the downstream direction, intelligent PON node 204 demultiplexes the multi-wavelength signal and maps each wavelength channel to a link that is coupled to a passive optical splitter. Each passive optical splitter is coupled to a set of ONUs that may reside at the home or office of a subscriber. For example, passive optical splitter 206 is coupled to ONU set 210, which includes ONUs 216, 218, and 220.

In one embodiment, each ONU set constitutes a separate PON operating independent from other ONUs. In the upstream direction, each ONU set transmit optical signals independently from other ONU sets because upstream transmissions from different PONs are carried on different wavelength channels on trunk fiber 214. As a result, the upstream transmission can be scheduled independently for each PON. In conventional systems, due to optical splitting loss, the number of ONUs that can couple to an OLT via a passive splitter is limited. Typically, no more than 128 ONUs can co-exist on a single-wavelength PON. However, by allowing multiple sets of ONUs to occupy different wavelength channels on trunk fiber 214, the total number of ONUs that can be supported by a single OLT can increase n fold, where n is the number of wavelength channels supported by OLT 202. For example, OLT 202 can provide up to 4 wavelength channels, each supporting up to 128 ONUs. As a result, the total number of ONUs, or the total number of subscribers, that are supported by OLT 202 can reach 512.

In addition to increasing the number of subscribers, embodiments of the present invention also extend the reach of a PON. A typical distance between the central office and an ONU in a traditional PON is often less than 20 km due to limited power budget and various types of optical loss, such as splitting loss and fiber loss. However, by placing an intelligent PON node in the field that can regenerate optical signals in both directions, it is possible to extend the distance from the central office to the ONU to 100 km or more. In one embodiment, the intelligent PON node can amplify and re-time signals before retransmission, thus can work as a repeater to extend the reach of the PON. Extending the reach of the PON can drastically reduce the cost of the entire network because it can simplify network architecture by consolidating the metro and access networks.

In addition to extending the reach of a PON, in some embodiments, an intelligent PON node is used in a multi-dwelling unit (MDU) environment, which can be an apartment building, a condominium, a hotel, or any other buildings that are subdivided into multiple residences. When being used in an MDU environment, such as being used for delivering service to users living in an apartment building, the intelligent PON node can be placed in the building basement in place of an OLT, which is used traditionally. The intelligent PON node can couple to a number of passive optical splitters, each capable of splitting downstream transmission to and combining upstream transmission from a number of ONUs. Due to the short distance between the intelligent PON node (which is located in the basement) and the ONUs (which are located in individual apartments), a greater splitting ratio, such as 1:128 or 1:256, can be possible. As a result, over 1000 subscribers can be supported by an intelligent PON node having 4 PON ports.

Figure 2B:
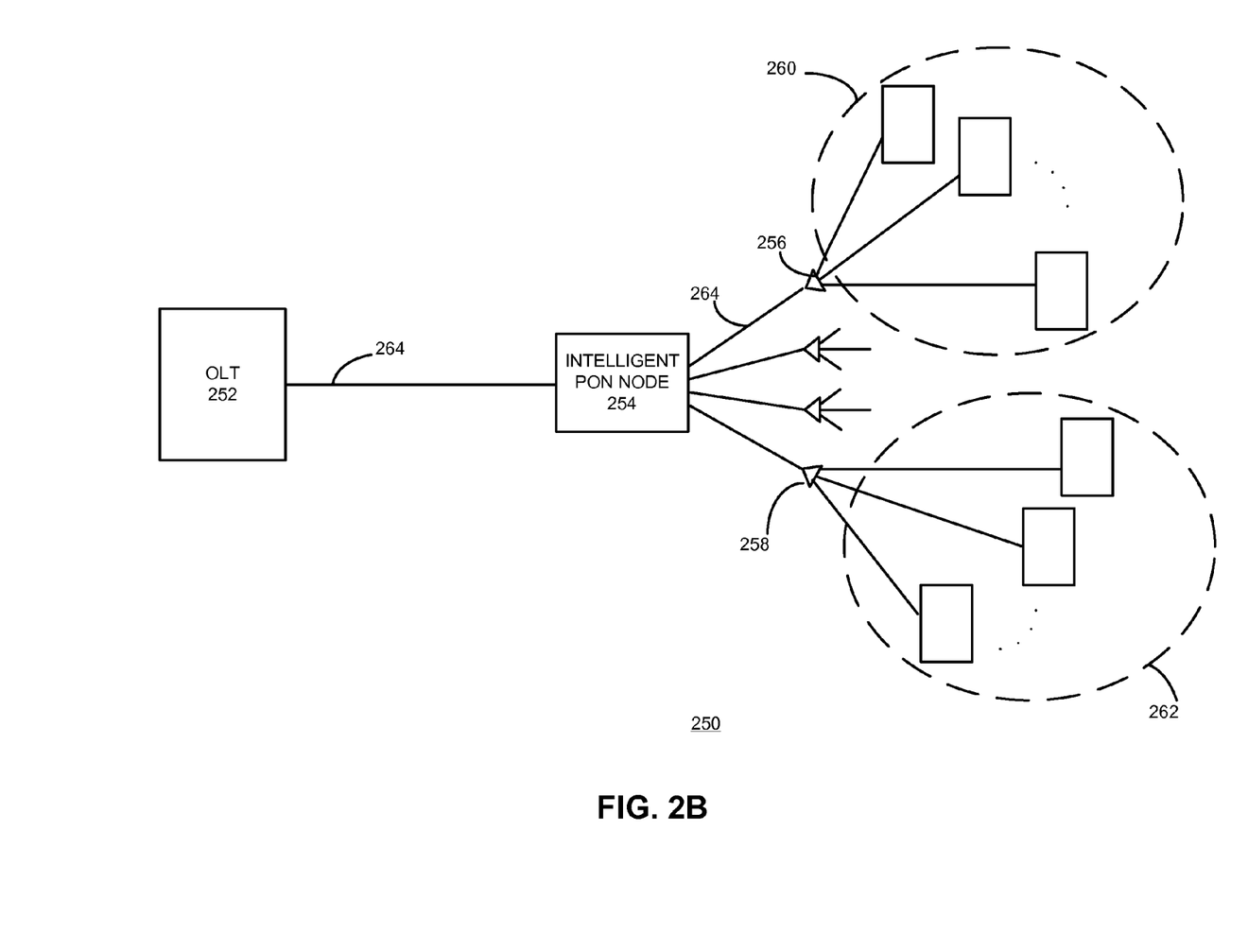
FIG. 2B presents a diagram illustrating the architecture of an exemplary hybrid PON that uses coaxial cables in accordance with an embodiment of the present invention.

In one embodiment, instead of optical fiber, copper wires, such as coaxial cables, are used to couple downstream ONUs to the intelligent PON node. FIG. 2B presents a diagram illustrating the architecture of an exemplary hybrid PON that uses coaxial cables in accordance with an embodiment of the present invention. Similar to the one shown in FIG. 2A, hybrid PON 250 includes an OLT 252, an intelligent PON node 254, and a number of sets of ONUs including ONU sets 260 and 262. A trunk fiber 264 couples intelligent node 254 to OLT 252. In contrast to the PON shown in FIG. 2A, in hybrid PON 250, coaxial cables and coaxial splitters are used to couple the ONU sets and intelligent PON node 254. For example, in FIG. 2B, coaxial cable 264 and coaxial splitter 256 are used to couple ONU set 260 to intelligent PON node 254.

Intelligent PON Node

Figure 3:
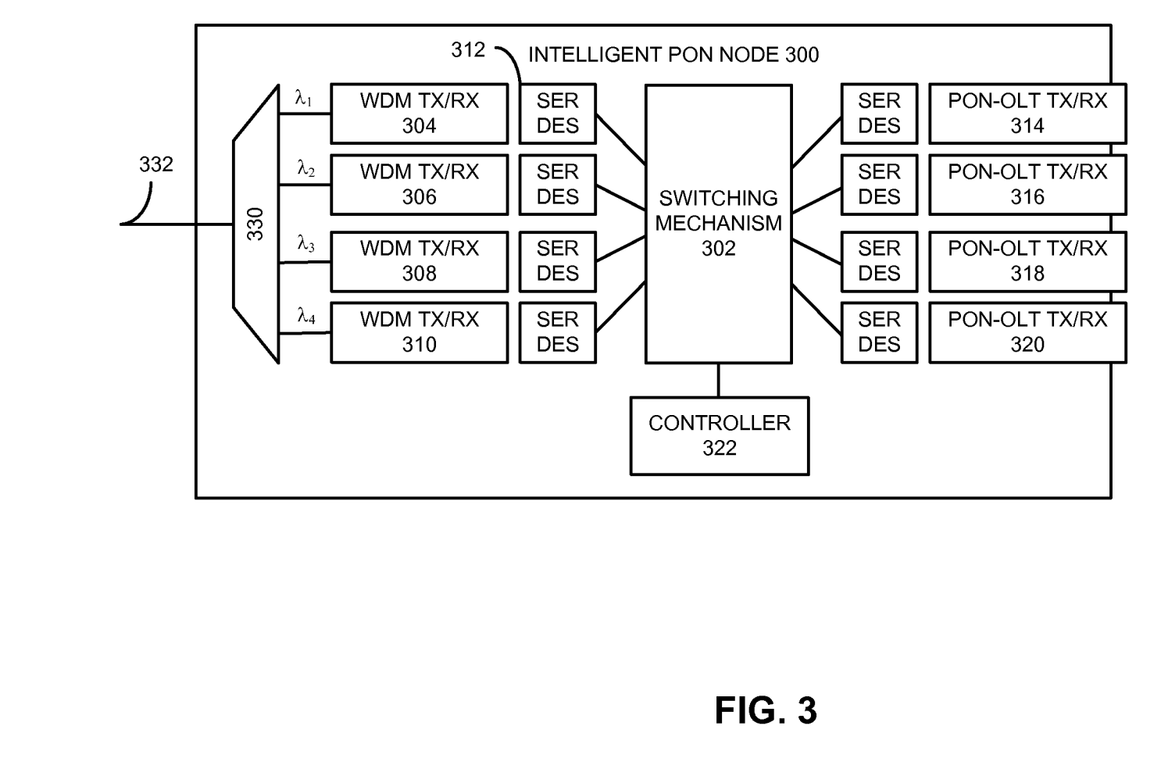
FIG. 3 presents a diagram illustrating the architecture of an exemplary intelligent PON node in accordance with an embodiment of the present invention.

FIG. 3 presents a diagram illustrating the architecture of an exemplary intelligent PON node in accordance with an embodiment of the present invention. Intelligent PON node 300 includes a reconfigurable switching mechanism 302, a number of WDM transceiver modules 304-310, a number of high-speed interfaces, such as serializer/deserializer 312, a number of PON transceiver modules 314-320, an intelligent node controller 322, and a WDM multiplexer/demultiplexer (MUX/DEMUX) 330.

WDM MUX/demux demultiplexes the multiple wavelength channels carried on trunk fiber 332, which is coupled to a remote OLT, into multiple single-wavelength channels corresponding to multiple OLT-side ports on intelligent PON node 300. Each OLT-side port includes a WDM transceiver module, including WDM transceiver modules 304-310. For example, WDM transceiver modules 304-310 operate on wavelengths $\lambda_1$-$\lambda_4$, respectively. In one embodiment, WDM transceiver modules 304-310 can include continuous-mode optical transceivers. In a further embodiment, WDM transceiver modules 304-310 can include PON transceivers, which operate in a burst mode. Each transceiver module is dedicated to a wavelength channel, and is coupled to reconfigurable switching mechanism 302 via a high-speed interface, such as SERDES 312. In one embodiment, WDM transceivers 304-310 are small form-factor pluggable (SFP) optical transceivers.

On the side facing the ONUs, intelligent PON node includes a number of ONU-side ports or PON ports, each includes a PON-OLT transceiver module, such as PON-OLT transceiver modules 314-320, which transmits optical signals to and receives optical signals from one of the multiple sets of downstream ONUs. In one embodiment, PON-OLT transceiver modules 314-320 include burst-mode optical transceivers. Each transceiver is coupled to a set of downstream ONUs via a passive splitter, thus allowing each ONU set (or each downstream PON) to have its own OLT optics. In one embodiment, PON-OLT transceiver modules 314-320 include small form-factor pluggable (SFP) optical transceivers operating in a burst mode. In the upstream direction, each PON-OLT transceiver module receives upstream traffic from the ONUs, and sends the traffic to reconfigurable switching mechanism 302 via a SERDES interface. Reconfigurable switching mechanism 302 cross-connects the upstream traffic to corresponding WDM transceiver modules based on its current configuration. Note that reconfigurable switching mechanism 302 can be implemented in field-programmable gate arrays (FPGAs) using firmware.

Intelligent node controller 322 configures switching mechanism 302 and communicates with the OLT to enable various remote network-management functionalities, including protection switching, remote upgrading, and performance monitoring, which includes monitoring the performance of the uplink and the downstream PONs. For example, controller 322 can read the status of the transceivers of the downstream PONs. In one embodiment, controller 322 registers as an ONU belonging to one of the downstream PONs (or one of the sets of the ONUs), and is assigned an LLID by the OLT. Therefore, the OLT can establish an Operations, Administration, and Management (OAM) communication path to controller 322, thus facilitate the configuration of switching mechanism 302. Controller 322 can be implemented as a system-on-a-chip (SoC) which may include a processor and a memory. In one embodiment, controller 322 can include an application-specific integrated circuit (ASIC) chip.

By reconfiguring switching mechanism 302, intelligent PON node 300 can aggregate upstream traffic from lightly loaded ONUs that belong to different downstream PONs into a single uplink. For example, when the OLT detects that the downstream PONs are lightly loaded (that is, only a few ONUs are initiating upstream transmissions), the OLT can instruct intelligent node controller 322 to reconfigure switching mechanism 302 to allow upstream transmissions from different downstream PONs to be switched to a single wavelength channel. As a result, only one wavelength channel needs to be active at the OLT, thus saving transmission equipment costs during the initial network-deployment stage, especially when the PON is deployed in sparsely populated areas.

In an embodiment, switching mechanism 302 can also function as a multiplexer/demultiplexer (MUX/DEMUX), which allows N wavelength channels between the OLT and intelligent node 300 to be multiplexed to M ports facing the subscribers. Note that N is not necessarily equals to M. A smaller N means a smaller number of OLT blades are configured to support a larger number of downstream PONs, thus allowing differed OLT equipment investment while the traffic remains relatively light. In contrast, a larger N allows a protection scheme where N-M OLT blades and/or N-M channels between the OLT and intelligent node 300 are in a hot standby mode.

Figure 4A:
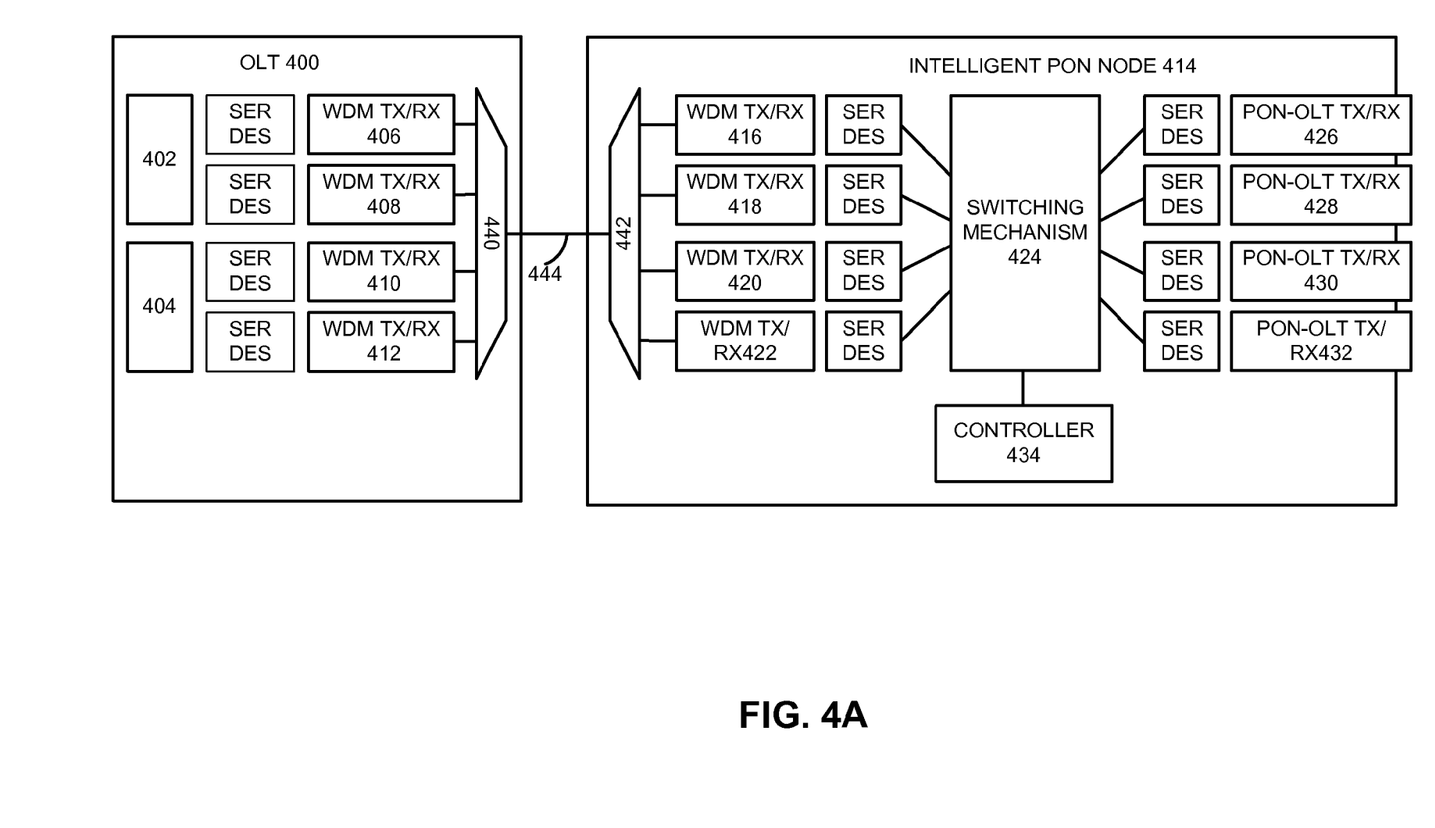
FIG. 4A presents a diagram illustrating the wavelength-channel assignment at the OLT without traffic aggregation at the intelligent node in accordance with an embodiment of the present invention.

FIG. 4A presents a diagram illustrating the wavelength-channel assignment at the OLT without traffic aggregation at the intelligent node in accordance with an embodiment of the present invention. In the example shown in FIG. 4A, OLT 400 includes OLT chips 402 and 404, each supporting two wavelength channels. Consequently, OLT 400 supports four wavelength channels, and WDM transceiver modules 406-412 provide input/output to those four wavelength channels. In one embodiment, WDM transceiver modules 406-412 include WDM SFP optical transceivers. The multiple wavelength channels on OLT 400 are multiplexed to a single trunk fiber 444 via a WDM MUX/DEMUX 440. Each WDM channel provided by OLT 400 corresponds to a WDM input/output channel on an intelligent PON node 414. In the downstream direction, a WDM MUX/DEMUX 442 located on intelligent PON node 414 demultiplexes the combined multiple-wavelength channel into 4 single-wavelength channels, each coupled to a WDM transceiver module, including WDM transceiver modules 416-422. A reconfigurable switching mechanism 424 cross-connects the WDM input/output channels on intelligent node 414 to corresponding PON-OLT transceiver modules 426-432, which transmit optical signals to and receive optical signals from the corresponding downstream PONs. In the upstream direction, the upstream transmissions from different PONs are mapped to different wavelength channels via switching mechanism 424, which is controlled by intelligent node controller 434. Hence, upstream transmissions from the different PONs are transmitted to OLT 400 on different wavelength channels by different WDM transceiver modules 416-422. At OLT 400, upstream transmission of each wavelength channel is received and processed independently by corresponding WDM optics and OLT logic.

Figure 4B:
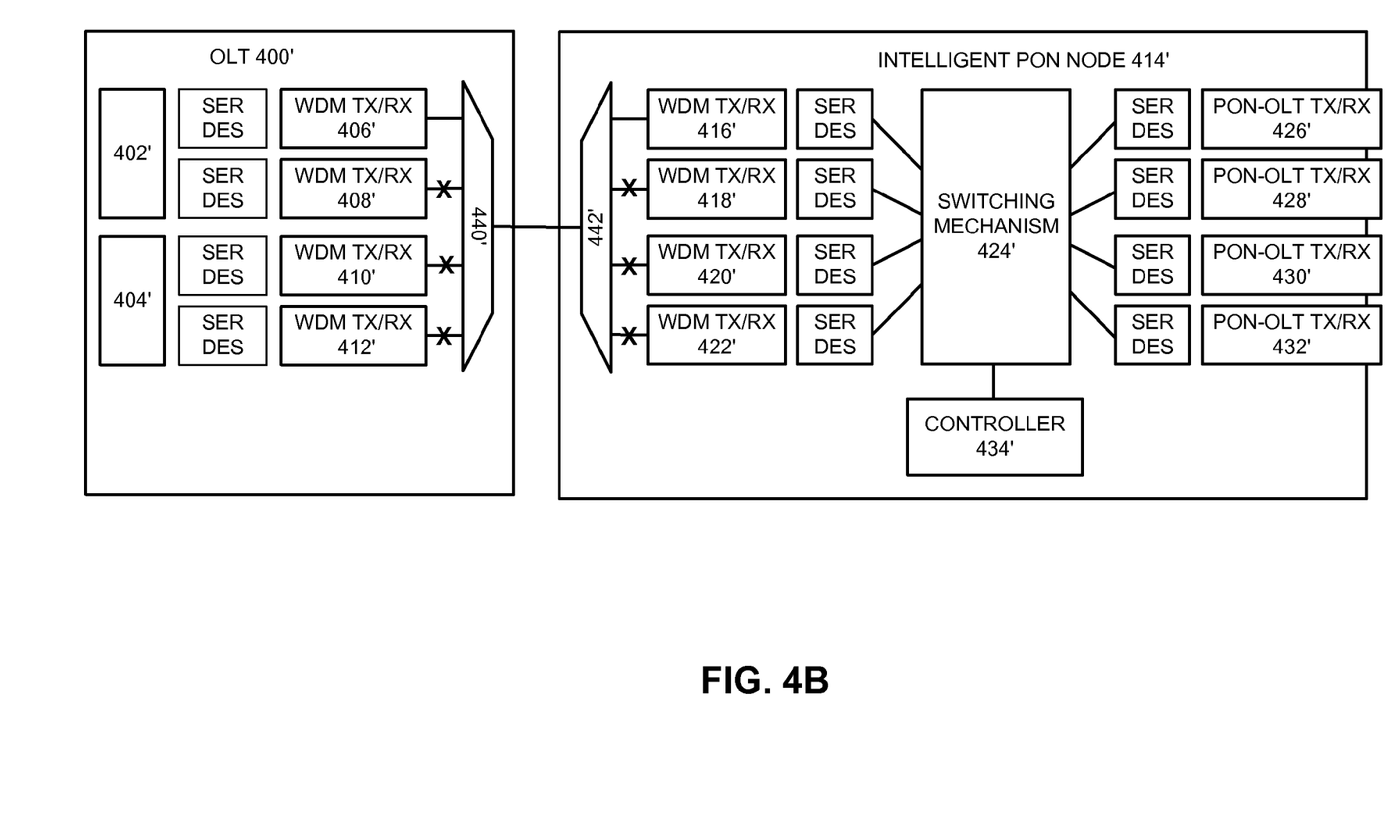
FIG. 4B presents a diagram illustrating the wavelength-channel assignment at the OLT while the intelligent node performs traffic aggregation in accordance with an embodiment of the present invention.

FIG. 4B presents a diagram illustrating the wavelength-channel assignment at the OLT while the intelligent node performs traffic aggregation in accordance with an embodiment of the present invention. In the example shown in FIG. 4B, similar to FIG. 4A, upstream transmissions from individual downstream PONs are received by PON-OLT transceiver modules 426'-432'. However, because the downstream PONs are lightly loaded (that is, only a few ONUs are transmitting within each PON, or the bandwidth request from each PON is low), the upstream transmissions from all ONUs are mapped into one wavelength channel by switching mechanism 424', which is controlled by intelligent node controller 434'. As a result, upstream transmissions from the different PONs are aggregated into a single wavelength channel, and are transmitted to OLT 400' via WDM transceiver module 416'. A corresponding WDM transceiver module 406' on OLT 400' receives the single wavelength upstream transmission. Accordingly, only one wavelength channel provided by OLT 400' is utilized. As shown in FIG. 4B, WDM transceiver modules 408'-412' and 418'-422' are not used. In other words, the upstream transmissions from the different PONs are aggregated to a single channel in OLT 400'. In one embodiment, intelligent node controller 434' can be configured to control switching mechanism 424' to aggregate upstream traffic from various PONs onto two or more wavelength channels depending on the load of the PONs. The ability of traffic aggregation by intelligent PON node 414' enables traffic-based reconfiguration of the whole network, thus reducing the initial cost of laying out the PON network. For example, in a sparsely populated area, the number of subscribers in each PON may be low. Thus, instead of investing in an OLT that is fully populated by transceiver modules, it is possible to implement an OLT that support only one or a few wavelength channels initially. As the number of subscribers or the amount of traffic increases, the OLT can scale up accordingly to support more wavelength channels. In one embodiment, the OLT can scale up by adding more WDM SFP transceivers.

In one embodiment, during the discovery process, in which the OLT discovers and initializes newly joined ONUs, the intelligent node controller is configured to identify which PON port a newly joined ONU is coupled to. As a result, when aggregating traffic from the various PON ports on the intelligent PON node, the OLT and the management system can better diagnose problems if they know which port contains a problematic ONU.

Figure 5:
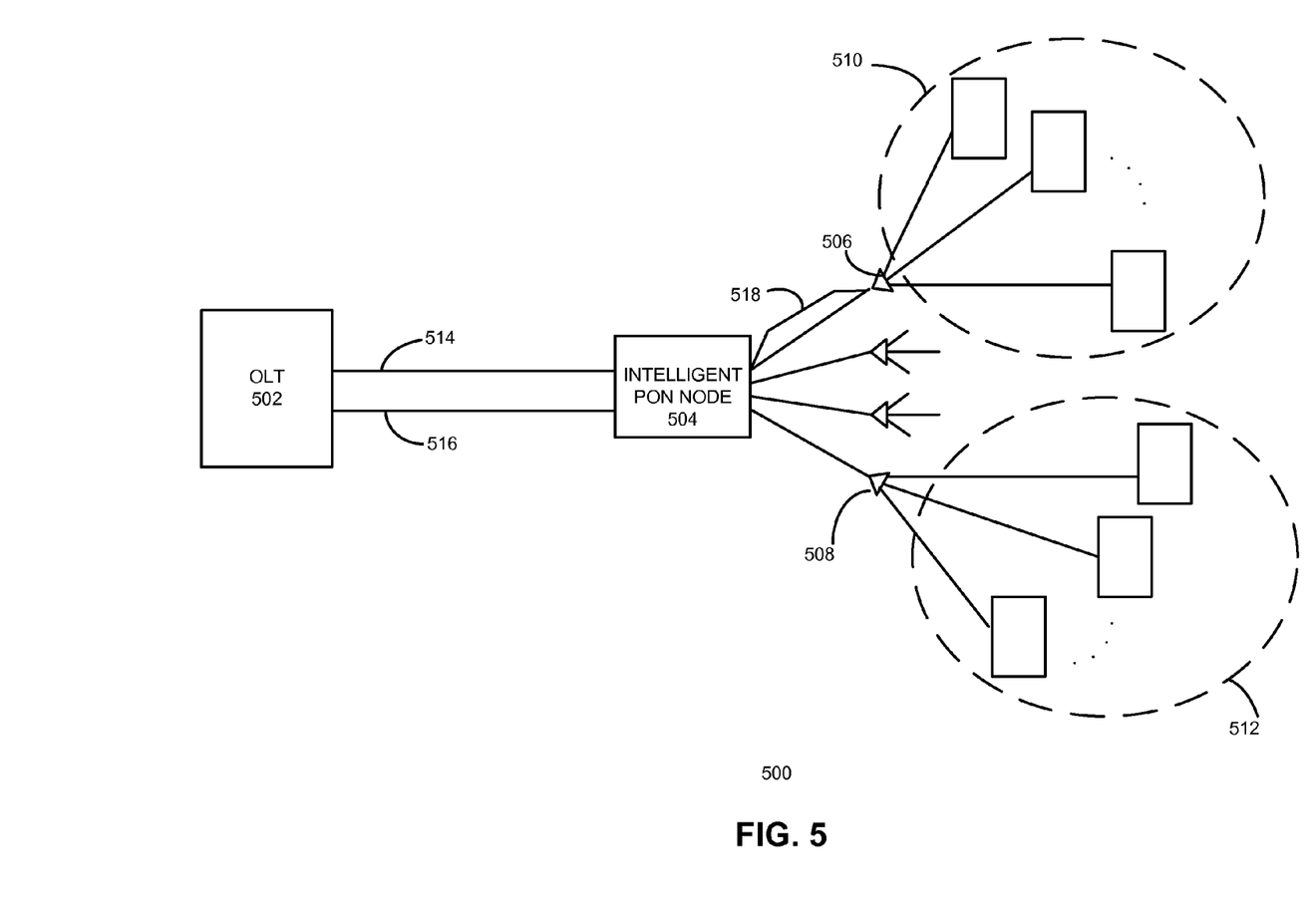
FIG. 5 presents a diagram illustrating the architecture of an exemplary extended-reach PON that enables protection switching in accordance with an embodiment of the present invention.

Some embodiments of the present invention also provide options for protection switching. FIG. 5 presents a diagram illustrating the architecture of an exemplary extended-reach PON that enables protection switching in accordance with an embodiment of the present invention. PON 500 includes an OLT 502, an intelligent PON node 504, a number of passive splitters, such as passive splitters 506 and 508, and a number of downstream PONs, such as PONs 510 and 512. To enable protection switching, more than one trunk fiber, such as trunk fibers 514 and 516, are included in PON 500 to couple OLT 502 and intelligent PON node 504. During operation, intelligent PON node 504 is configured to select different uplink paths to OLT 502 based on fiber status. For example, if trunk fiber 514 is cut, intelligent PON node 504 can switch traffic originally carried over trunk fiber 514 to trunk fiber 516 by selecting a corresponding transceiver. In addition, spare fibers can also be added between intelligent PON node 504 and the passive splitters (for example, in FIG. 5, a spare fiber 518 is added between intelligent PON node 504 and passive optical splitter 506) to enable type A protection between node 504 and splitter 506. Similarly, when a fiber cut happens, intelligent PON node 504 may switch traffic to spare fiber 518 by selecting a corresponding transceiver.

In addition to fast protection switching, the multiple fibers between OLT 502 and intelligent PON node 504 also enable remote diagnostic testing, non-service interrupting loopback testing, remote upgrade of the reconfigurable switching mechanism and the intelligent node controller.

Figure 6:
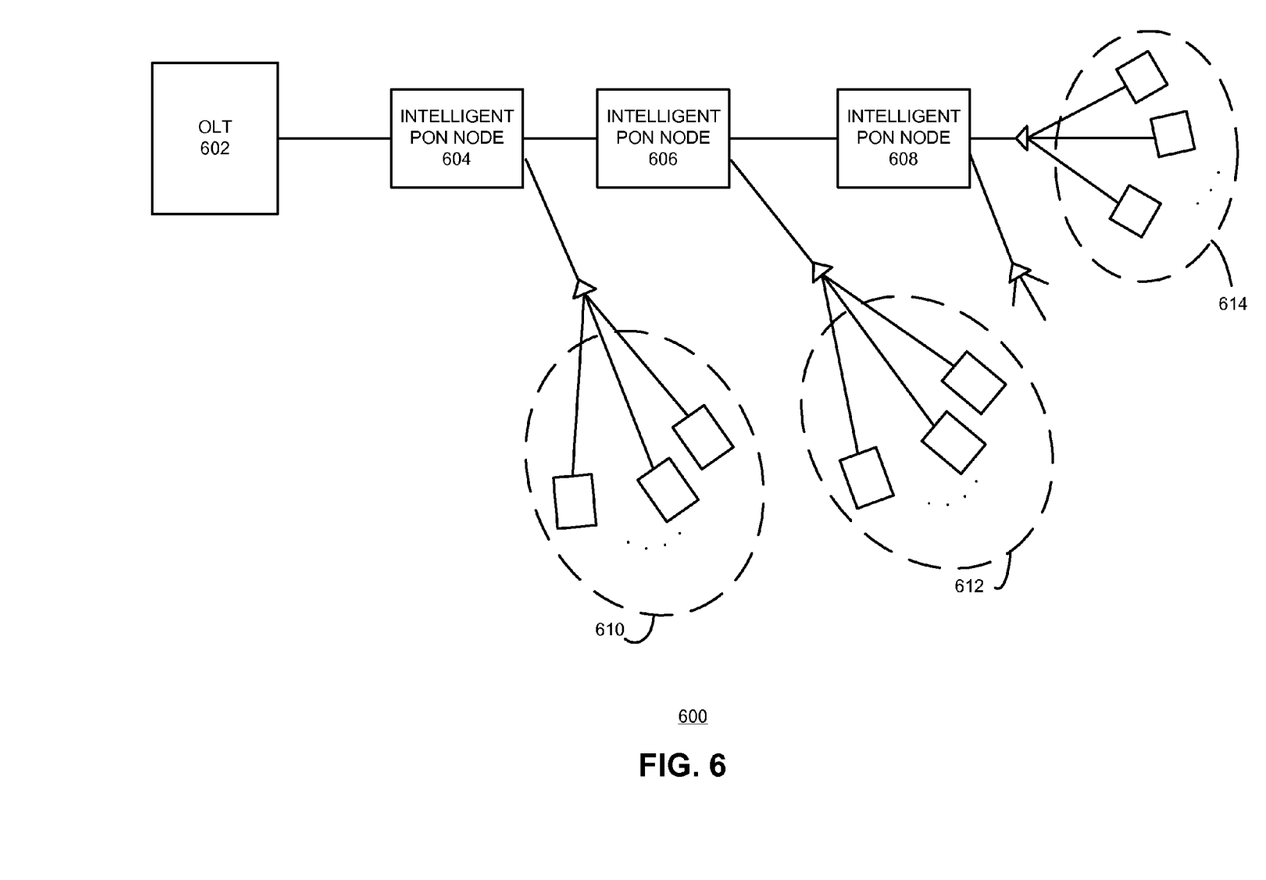
FIG. 6 presents a diagram illustrating the architecture of an exemplary PON with multiple intelligent PON nodes in accordance with an embodiment of the present invention.

In one embodiment, more than one intelligent PON node can be used to further extend the reach of the PON or to support even more subscribers. FIG. 6 presents a diagram illustrating the architecture of an exemplary PON with multiple intelligent PON nodes in accordance with an embodiment of the present invention. PON 600 includes an OLT 602 and a number of cascaded intelligent PON nodes 604-608. Each intelligent PON node is coupled to a number of downstream ONU sets (or downstream PONs). For example, intelligent PON nodes 604-608 are coupled to ONU sets 610-614, respectively. In addition, an intelligent PON node can also couple to a downstream intelligent PON node using one of its PON port. For example, intelligent PON node 604 couples to intelligent PON node 606, which further couples to intelligent PON node 608. Because an intelligent PON node can regenerate signal, this cascaded structure can further extend the reach of the PON. In addition, this architecture allows the intelligent PON node to act as an add-drop multiplexer (ADM) to connect or disconnect a downstream PON (an ONU set coupled to the same passive splitter) based on subscription need, thus providing greater architectural flexibility.

Figure 7:
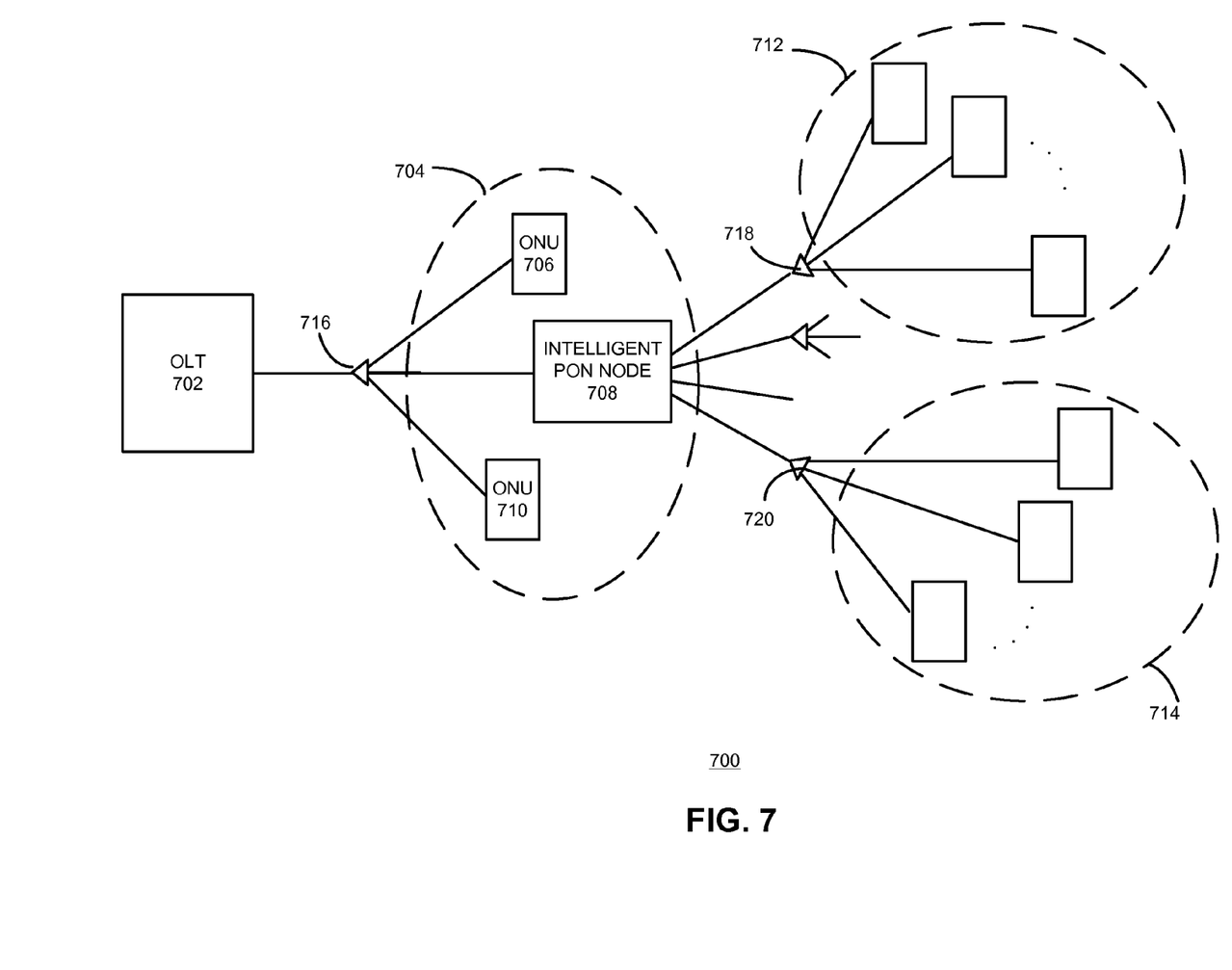
FIG. 7 presents a diagram illustrating the architecture of a cascaded PON in accordance with an embodiment of the present invention In the figures, like reference numerals refer to the same figure elements.

One embodiment of the present invention includes a cascaded PON structure which includes a main PON coupled directly to the OLT and a secondary PON coupled to an intelligent PON node. FIG. 7 presents a diagram illustrating the architecture of a cascaded PON in accordance with an embodiment of the present invention. Cascaded PON 700 includes an OLT 702, which couples to a main PON 704 via a passive optical splitter 716. Main PON 704 includes a number of ONUs, such as ONUs 706 and 710, and an intelligent PON node 708. Intelligent PON node 708 further couples to a number of secondary PONs, such as secondary PONs 712 and 714, via a number of passive optical splitters, such as splitters 718 and 720.

In the example shown in FIG. 7, intelligent PON node 708 includes a number of transceivers facing OLT 702 and a number of transceivers facing the downstream ONU sets. The transceivers facing OLT 702 can be PON-ONU transceivers, while the transceivers facing the ONU sets can be PON-OLT transceivers. Intelligent PON node 708 can includes a switching mechanism configured to cross-connect the OLT-side transceivers and the ONU-side transceivers. The switching mechanism can be controlled to aggregate upstream traffic from the multiple secondary PONs.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. An intelligent node, comprising:
a number of optical line terminal (OLT)-side transceivers configured to transmit optical signals to and receive optical signals from an OLT over a first optical fiber using a number of wavelength channels;
a number of optical network unit (ONU)-side transceivers, wherein a respective ONU-side transceiver is configured to transmit optical signals to and receive optical signals from a passive optical network (PON);
a switching mechanism configured to couple the OLT-side transceivers and the ONU-side transceivers; and
a controller configured to control the coupling performed by the switching mechanism, wherein the controller is configured to register as an ONU.

2. The intelligent node of claim 1, wherein the controller is configured to receive an Operations, Administration, and Management (OAM) message from the OLT, thereby facilitating remote management of the intelligent node.

3. The intelligent node of claim 1, wherein the controller is configured to conduct performance monitoring.

4. The intelligent node of claim 1, wherein the controller is configured to aggregate upstream traffic from a number of PONs that are each coupled to a different one of the ONU-side transceivers.

5. Tne intelligent node of claim 1, further comprising at least one of:
one OLT-side transceiver coupled to a second optical fiber to facilitate protection switching between the OLT and the intelligent node; and
one ONU-side transceiver coupled to a spare optical fiber to facilitate protection switching between the intelligent node and a passive optical splitter.

6. The intelligent node of claim 1, wherein during a discovery process the controller is configured to identify a port, through which a newly discovered ONU is coupled to the intelligent node.

7. The intelligent node of claim 1, wherein the intelligent node is coupled to the OLT via a first passive optical splitter, and wherein the intelligent node is coupled to the PON via a second passive optical splitter.

8. The intelligent node of claim 1, wherein the controller is implemented as a system-on-a-chip (SoC).

9. The intelligent node of claim 1, wherein at least one ONU-side transceiver is configured to transmit optical signals to and receive optical signals from a different intelligent node.

10. A system comprising:
an optical line terminal (OLT) configured to support a number of wavelength-division-multiplexing (WDM) channels;
a first optical fiber; and
a first intelligent node coupled to the OLT via the first optical fiber, wherein the intelligent node comprises:
a number of OLT-side transceivers configured to transmit optical signals to and receive optical signals from the OLT over the first optical fiber using a number of wavelength channels;
a number of optical network unit (ONU)-side transceivers, wherein a respective ONU-side transceiver is configured to transmit optical signals to and receive optical signals from a passive optical network (PON);
a switching mechanism configured to couple the OLT-side transceivers and the ONU-side transceivers; and
a controller configured to control the coupling performed by the switching mechanism, wherein the controller is configured to register as an ONU.

11. The system of claim 10, wherein the controller is configured to receive an Operations, Administration, and Management (OAM) message from the OLT, thereby facilitating remote management of the first intelligent node.

12. The system of claim 10, wherein the controller is configured to conduct performance monitoring.

13. The system of claim 10, wherein the controller is configured to aggregate upstream traffic from a number of PONs that are each coupled to a different one of the ONU-side transceivers.

14. The system of claim 10, comprising at least one of:
one OLT-side transceiver coupled to a second optical fiber to facilitate protection switching between the OLT and the first intelligent node; and
one ONU-side transceiver coupled to a spare optical fiber to facilitate protection switching between the first intelligent node and a passive optical splitter.

15. The system of claim 10, wherein the controller is implemented as a system-on-a-chip (SoC).

16. The system of claim 10, wherein during a discovery process the controller is configured to identify a port, through which a newly discovered ONU is coupled to the first intelligent node.

17. The system of claim 10, further comprising a passive optical splitter, wherein the passive optical splitter is configured to couple a number of ONUs and the first intelligent node to the OLT.

18. The system of claim 10, further comprising a second intelligent node coupled to the first intelligent node via an ONU-side transceiver on the first intelligent node.

19. The system of claim 10, wherein the distance between the OLT and an ONU is between 20 km to 100 km.

20. The system of claim 10, wherein the number of ONUs supported by the OLT is over 500.

21. An intelligent node, comprising:
an optical line terminal (OLT)-side transceiver configured to transmit optical signals to and receive optical signals from an OLT via different intelligent node;
a number of optical network unit (ONU)-side transceivers, wherein a respective ONU-side transceiver is configured to transmit optical signals to and receive optical signals from a passive optical network (PON);
a switching mechanism configured to couple the OLT-side transceivers and the ONU-side transceivers; and
a controller configured to control the coupling performed by the switching mechanism, wherein the controller is configured to register as an ONU.

* * * * *

UNITED STATES PATENT AND TRADEMARK OFFICE
CERTIFICATE OF CORRECTION

| | |
|---|---|
| PATENT NO. | : 8,532,487 B2 |
| APPLICATION NO. | : 12/581452 |
| DATED | : September 10, 2013 |
| INVENTOR(S) | : Edward W. Boyd et al. |

Page 1 of 1

It is certified that error appears in the above-identified patent and that said Letters Patent is hereby corrected as shown below:

In the Claims

Column 10, line 16, please replace "Tne intelligent node of claim 1" with --The intelligent node of claim 1--.

Signed and Sealed this
Nineteenth Day of November, 2013

Teresa Stanek Rea
*Deputy Director of the United States Patent and Trademark Office*